US009129285B2

(12) United States Patent
Chan et al.

(10) Patent No.: US 9,129,285 B2
(45) Date of Patent: Sep. 8, 2015

(54) PREVIEWING IN LIVE ELECTRONIC COMMERCE ENVIRONMENT

(75) Inventors: Victor S. Chan, Thornhill (CA); Darshanand Khusial, Mississauga (CA); Jacob T. Vandergoot, Bradford (CA)

(73) Assignee: International Business Machines Corporation, Armonk, NY (US)

( * ) Notice: Subject to any disclaimer, the term of this patent is extended or adjusted under 35 U.S.C. 154(b) by 1895 days.

(21) Appl. No.: 11/341,771

(22) Filed: Jan. 27, 2006

(65) Prior Publication Data

US 2007/0179892 A1 Aug. 2, 2007

(51) Int. Cl.

| | |
|---|---|
| ***G06F 3/00*** | (2006.01) |
| ***G06F 17/00*** | (2006.01) |
| ***G06Q 30/00*** | (2012.01) |
| ***G06Q 90/00*** | (2006.01) |

(52) U.S. Cl.
CPC ................ *G06Q 30/00* (2013.01); *G06Q 90/00* (2013.01)

(58) Field of Classification Search
USPC .................................... 705/1-79; 725/25, 37
See application file for complete search history.

(56) References Cited

U.S. PATENT DOCUMENTS

| | | | | |
|---|---|---|---|---|
| 5,237,157 | A * | 8/1993 | Kaplan | 235/375 |
| 5,812,764 | A * | 9/1998 | Heinz, Sr. | 726/5 |
| 6,026,371 | A | 2/2000 | Beck et al. | 705/14 |
| 6,055,637 | A * | 4/2000 | Hudson et al. | 726/20 |
| 6,256,739 | B1 * | 7/2001 | Skopp et al. | 726/2 |
| 6,275,825 | B1 * | 8/2001 | Kobayashi et al. | 707/9 |
| 6,308,327 | B1 * | 10/2001 | Liu et al. | 725/37 |
| 6,449,651 | B1 * | 9/2002 | Dorfman et al. | 709/229 |
| 6,510,523 | B1 * | 1/2003 | Perlman et al. | 726/6 |
| 6,606,659 | B1 * | 8/2003 | Hegli et al. | 709/225 |
| 7,373,594 | B1 * | 5/2008 | Lopez et al. | 715/229 |
| 2001/0034635 | A1 * | 10/2001 | Winters | 705/10 |
| 2001/0054068 | A1 | 12/2001 | Modiano | 709/203 |
| 2002/0073058 | A1 | 6/2002 | Kremer et al. | 707/1 |
| 2002/0184165 | A1 | 12/2002 | Deboer et al. | 706/1 |
| 2002/0184255 | A1 | 12/2002 | Edd et al. | 707/500 |
| 2003/0023564 | A1 * | 1/2003 | Padhye et al. | 705/54 |
| 2003/0149653 | A1 | 8/2003 | Penney et al. | 705/37 |
| 2004/0015586 | A1 * | 1/2004 | Hegli et al. | 709/225 |
| 2005/0149397 | A1 * | 7/2005 | Morgenstern et al. | 705/14 |
| 2005/0187993 | A1 | 8/2005 | Selman et al. | 707/204 |
| 2005/0216421 | A1 * | 9/2005 | Barry et al. | 705/64 |
| 2006/0023240 | A1 * | 2/2006 | Natori | 358/1.13 |
| 2006/0031503 | A1 * | 2/2006 | Gilbert | 709/225 |
| 2006/0277469 | A1 * | 12/2006 | Chaudhri et al. | 715/709 |
| 2007/0211720 | A1 * | 9/2007 | Fuchs et al. | 370/390 |
| 2008/0306883 | A1 * | 12/2008 | Baffier et al. | 705/400 |

* cited by examiner

*Primary Examiner* — Kimberly Berona
*Assistant Examiner* — Murali K Dega
(74) *Attorney, Agent, or Firm* — DeLizio Law, PLLC

(57) ABSTRACT

Future promotions can be tested on a live production website with a preview web application that is separate from a live production web application used by customers. A preview session is established with the preview web application on a live production server responsive to receiving a request to perform a command on the live production server in a preview mode that allows testing of a future promotion. A preview context and a content context are instantiated for the preview session. The preview context indicates a time in the future to use in processing the request on the live production server. The preview web application dispatches the request to the live production web application on the live production server. The second web application processes the request with business logic based, at least in part, on the preview context and the content context.

20 Claims, 4 Drawing Sheets

PREVIEWING IN LIVE ELECTRONIC COMMERCE ENVIRONMENT

BACKGROUND OF THE INVENTION

1. Field of the Invention

The present invention relates generally to a data processing system. More specifically, the present invention provides a method, computer program product and data processing system for previewing electronic commerce content in a live electronic commerce environment.

2. Description of the Related Art

Modern computing technology has resulted in immensely complicated and ever-changing environments. One such environment is the Internet, which is also referred to as an "internetwork." The Internet is a set of computer networks, possibly dissimilar, joined together by means of gateways that handle data transfer and the conversion of messages from a protocol of the sending network to a protocol used by the receiving network. When capitalized, the term "internet" refers to a collection of networks and gateways that use the TCP/IP suite of protocols. Currently, the most commonly employed method of transferring data over the Internet is to employ the World Wide Web environment, also called the "Web".

The existence and continued acceptance and use of the Web and the Internet have resulted in many new and useful applications becoming available to users of the Internet. One useful and popular application is e-Commerce. E-Commerce has become a common part of everyday life. There have been a number of incidents in the industry where live e-Commerce sites were updated with incorrect pricing. While this has been favorable with the consuming public, it has caused immeasurable embarrassment for the e-Commerce merchants affected.

Today, most e-Commerce sites test their changes on a separate server before replicating these changes onto a production server. However, there are a number of circumstances where this may not be practical. For example, for small and medium sized business merchants, an extra server represents a significant expenditure and may use a large portion of the merchant's budget. However, previewing may be more vital to the small and medium sized business merchants than to large merchants, as a pricing error may prove to be more detrimental to the profits of small and medium sized merchants than to a large merchant.

Additionally, it may be easier to preview certain scenarios on a live site, than on a test server, such as promotions based on user data. A live server is a production environment server that an actual customer would access when shopping on that site. That is, a live server is the actual production server that the customer accesses when placing an actual order or browsing through actual content.

For example, a merchant may notice that there are some states whose markets they have not penetrated. The merchant may want to use a promotion to increase his/her presence in these markets by giving a 30% discount to all states where they have fewer than a thousand customers. This scenario can certainly be replicated on a test environment, but it is much easier, in terms of configuration and time, to preview this scenario on a live site.

Another scenario where it would be advantageous to test the system on a live server is where there are promotions based on specific dates. Business users, particularly catalog and marketing managers, may want to be able to preview their time-sensitive content updates in order to make sure they appear correctly. For marketing campaigns that are scheduled in advance, there needs to be ability for content providers to ensure that their future campaigns will operate as expected, short of modifying the system clock of their system.

Furthermore, business may desire to prevent customers from viewing experimental data on a production system. Typically this type of data must go through some approval flow before being published to customers of the site.

Based on these business requirements, it becomes necessary to preview the changes that a content provider makes on a production site before those changes are enabled for customers. Additionally, for usability, a content provider who is making content changes may find it desirable to simultaneously preview the changes as they would appear to a customer for whom the changes are targeted.

BRIEF SUMMARY OF THE INVENTION

The present invention provides a method, computer program product and data processing system for previewing electronic commerce content in a live electronic commerce environment. A preview mode is selected on a live electronic commerce server, wherein a preview application is invoked. A unique user session associated with a user is created for the preview mode. A user request is verified to ensure that the request originates from the user associated with unique user session. The request is dispatched to an electronic commerce application on the live electronic server and the request is executed.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
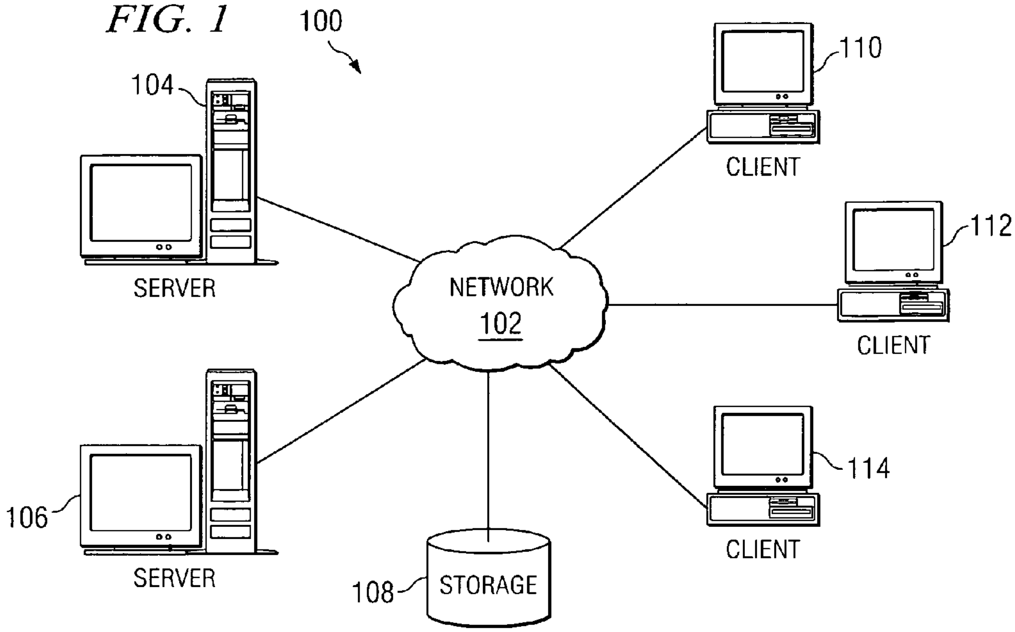
FIG. 1 is a pictorial representation of a network of data processing systems in which exemplary aspects of the present invention may be implemented.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer useable or readable medium may be utilized. The computer-usable medium may be, for example but not limited to, an electronic, magnetic, optical, electromagnetic, or infrared, propagation medium. Examples (a nonexhaustive list) of a computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device a semiconductor system, a device, or a magnetic storage device. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention provides a method, apparatus, and computer program product for previewing electronic commerce content in a live electronic commerce environment.

Figure 2:
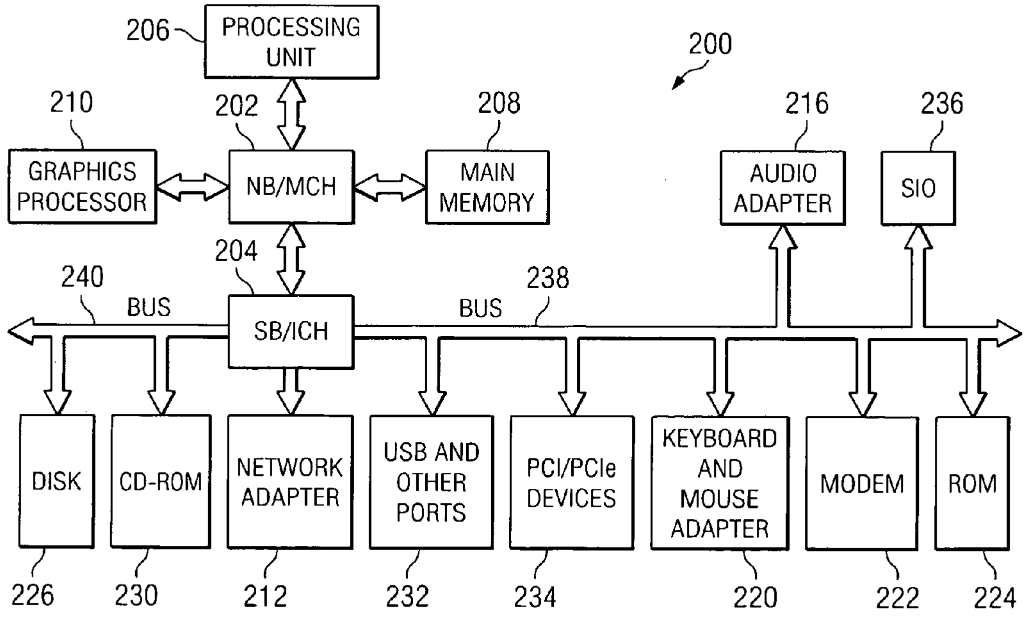
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202.

Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
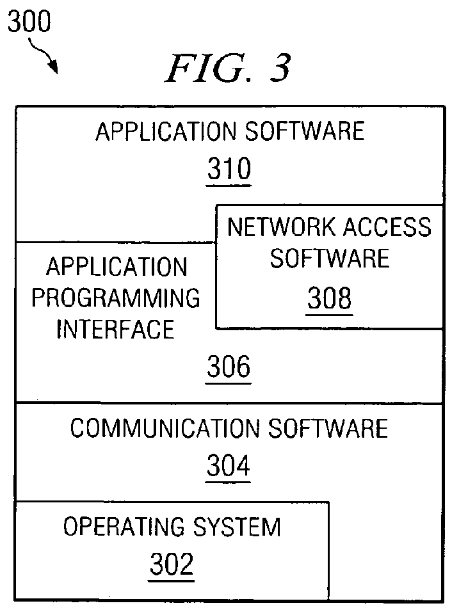
FIG. 3 is a block diagram depicting typical software architecture for a server-client system in which exemplary aspects of the present invention may be implemented.

Turning to FIG. 3, typical software architecture, generally denoted by reference number 300, for a server-client system is depicted in which exemplary aspects of the present invention may be implemented. At the lowest level, operating system 302 is utilized to provide high-level functionality to the user and to other software. Such an operating system typically includes a basic input output system (BIOS). Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers.

Application software 310 represents any number of software applications designed to react to data through the communications port to provide the desired functionality the user seeks, such as a Web application. Applications at this level may include those necessary to handle data, video, graphics, photos or text, which can be accessed by users of the Internet.

An exemplary embodiment of the present invention assumes that customers access an electronic commerce site through a Web application. To allow for preview operations on the site, an additional Web application, a preview Web application, is added to the site's application server. This preview Web application enables a live site to cleanly separate preview operations to test how changes will appear from normal site operations.

In the typical e-Commerce application, one Web application is used for content manipulation, the administrative Web application, and another, the store front Web application, is used by the customers of the site to shop. To satisfy the requirements for preview, another Web application is introduced which the content provider will be redirected to when the content provider needs to preview content. This preview Web application would allow the content provider to view various 'scenarios' of the store before the changes are applied to the production store and available to the customers.

The preview Web application, as part of the request preprocessing, is responsible for invoking a preview session management and preview context functionality for managing a user's operations when in preview mode. After performing the necessary pre-processing activities the preview Web application dispatches onto the existing site's Web application for normal processing. Some types of preview specific operations performed before dispatch include, but are not limited to i) in a client session, establishing a unique identity for preview operations that is distinct from normal the identity used for site operations; ii) setting up preview context information that allows for testing various scenarios; iii) filtering operations that are not allowed in preview; iv) ensuring that preview information served is real-time and not from the site's cache; and v) preventing real customer operation data from being mixed with preview operation data in such scenarios logging site traffic for analytic purposes or adjusting inventory level when adding products to the shopping cart.

Exemplary embodiments of the present invention enable merchants to perform preview operations without the need for a separate staging server. Previewing on the live production site ensures that mistakes that were possible when replicating from a staging server to a production site are no longer possible; for example, forgetting to replicate time sensitive promotions.

Exemplary embodiments of the present invention make it possible to simultaneously preview and perform administrative operations using a single browser process. Exemplary embodiments of the present invention also control what operations are allowed in preview so as not to affect a site's order inventory during preview. Exemplary embodiments of the present invention make it clearly visible, via URL inspection, to know when the user is in preview mode.

Additionally, the original Web application does not have to be modified to accommodate the preview mode. Previewing can be safely preformed behind a firewall even if the site is exposed to the Internet. This is because the preview Web application is on a separate port from the actual Web application. Therefore a firewall can be established for the preview Web application's port in order to limit access to the preview Web application. Exemplary embodiments of the present invention enable content management support on a production site without influencing the flow for processing non-content management activities.

The examples discussed in FIGS. 4-8 refer to an adapter, or adapter module. The adapter module is not necessary to implement exemplary aspects of the present invention and is not meant to limit the invention to any particular architecture or implementation. The adapter discussed in the examples below is used to manage certain pre-processing activities. Those skilled in the art will realize that it is not necessary to use an adapter or adapter module to manage the pre-processing activities and that, depending upon the implementation, there are many ways to achieve this purpose.

Figure 4:
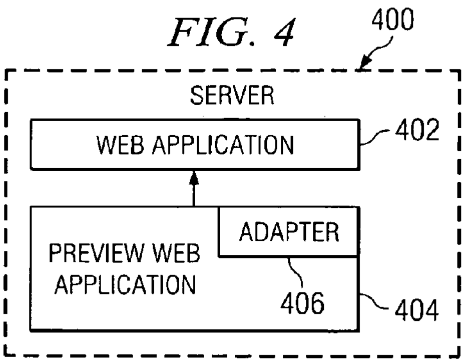
FIG. 4 is a block diagram of a system for previewing e-commerce Web applications in accordance with an exemplary embodiment of the present invention.

Turning to the figures, FIG. 4 is a block diagram depicting a system for previewing e-commerce Web applications in accordance with an exemplary embodiment of the present invention. Server 400, which may be implemented as a server such as server 104 in FIG. 1, has Web application 402 and preview Web application 404 installed. Preview Web application 404 performs various pre-processing operations before dispatching onto Web application 402. Once preview Web application 404 finishes pre-processing, adapter 406 is passed from preview Web application 404 to Web application 402. Adapter 406 maintains a preview session that is different from the session that would have been created by the production Web application, Web application 402.

Figure 5:
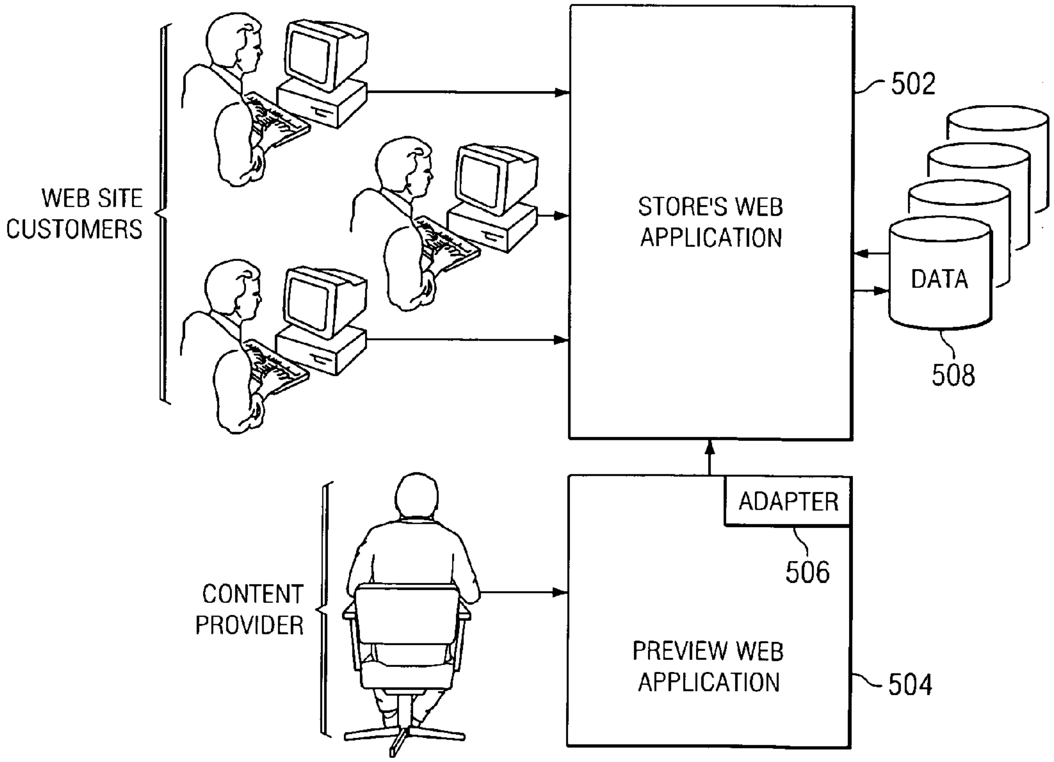
FIG. 5 is a pictorial representation of a generic implementation of an exemplary embodiment of the present invention.

FIG. 5 is a pictorial representation of a generic implementation of an exemplary embodiment of the present invention. Store's Web application 502 and preview Web application 504 are installed on the same server. Preview Web application 504 performs various pre-processing operations before dispatching onto store's Web application 502. Once preview Web application 504 finishes pre-processing, adapter 506 is passed from preview Web application 504 to store's Web application 502. Adapter 506 maintains a preview session that is different from the session that would have been created by the store's production Web application, store's Web application 502. Data 508 represents database entities. In an exemplary embodiment, data 508 is implemented as Enterprise Java Beans.

In the typical e-Commerce application, one Web application is used for content manipulation, and another Web application, the store's electronic Web application, is used by the customers of the site to shop the site. To satisfy the requirements for previewing, another Web application is introduced that the content provider will be redirected to when he or she needs to preview. This preview Web application would allow the content provider to view various 'scenarios' of the store's Web application before the changes are applied to the store's production Web application.

By using a separate store's Web application 502, adapter 506 is able to determine, based on the root of the application, when an operation is being executed under preview mode versus regular mode. Hence, this gives the advantage of not needing to modify the business logic to be aware of preview versus regular store mode.

The main task of preview Web application 504 is to perform the necessary pre-processing in preview Web application 504 before dispatching onto store's Web application 502. The pre-processing may include activities such as ensuring that preview pages being rendered are not from the site's cache.

Adapter 506 acts as a gateway through which all requests to the business logic must flow. This enables management of the preview session and establishment of contexts used for preview. Adapter 506 is registered to preview Web application 504 to manage the session of users accessing the site via preview Web application 504. Adapter 506 may copy information from an administrative user to properly setup the preview user's session. Additionally, adapter 506 is responsible for instantiating and populating the preview context.

In an exemplary embodiment, preview Web application 504 establishes various contexts in the preview environment. The purpose of a context is to convey state or environment information associated with a request. There is a set of contexts that is unique per each session in the preview environment and contains preview information such as a future time. A preview context is used to encapsulate data and functionality that business logic on the site may use in processing data and rendering display information specific to the preview mode. For example, a preview context may be used to simulate a special promotion that will occur 90 days in the future.

Another context, a content context, may specify how the data can be viewed. This context is used for managing content data that will be controlled by selected individuals. Before this data is made available for general viewing it may go though an approval process. In order to view the changes, this additional context needs to be carried forward in the preview session to view these changes. By only allowing this context to be available to the preview and line of business tooling of Web applications, an online customer cannot view data until it has gone though the approval process and made generally available.

Figure 6:
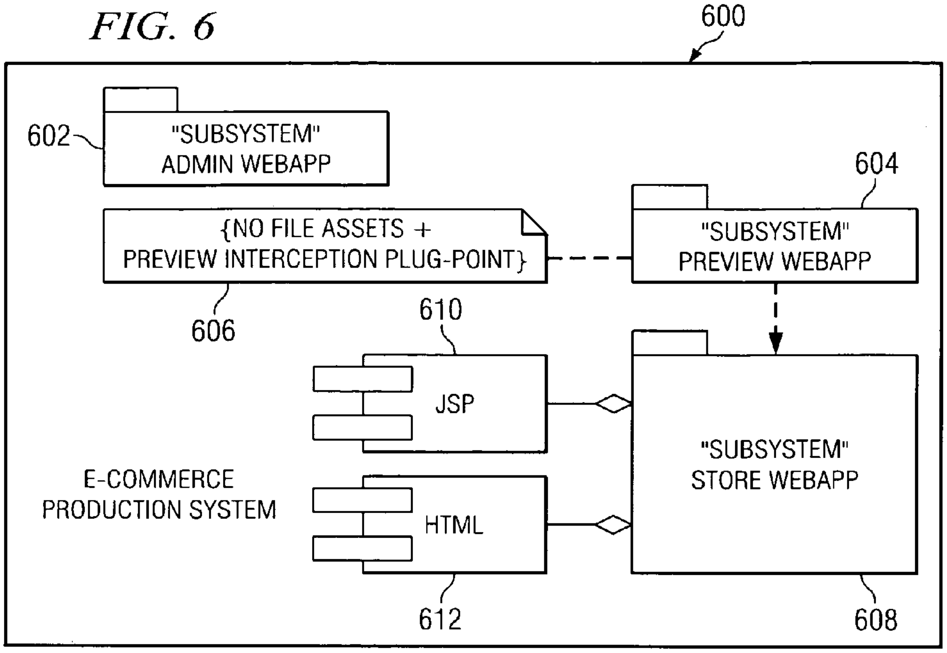
FIG. 6 is a block diagram of a deployment model of the preview capability in a production environment in accordance with a preferred embodiment of the present invention.

FIG. 6 is a block diagram depicting the deployment model of the preview capability in a production environment in accordance with a preferred embodiment of the present invention. As mentioned in relation to FIG. 5, in a typical e-Commerce application, such as e-Commerce Production system 600, one Web application is used for content manipulation. This application is called the administrative Web application, Admin WebApp 602. Another Web application, the store's Web application, Store WebApp 608, is used by the customers of the site to shop. To satisfy the requirements for previewing, another Web application, Preview WebApp 604, is introduced, to which the content provider will be redirected when the content provider needs to preview.

As shown, Preview WebApp 604 is dependent on Store WebApp 608. Preview WebApp 604 does not contain assets or perform business logic processing itself; instead, Preview WebApp 604 acts as an interception plug-point where requests are either handled or forwarded to Store WebApp 608 for business logic execution and rendering pages. Interception plug-point 606 is where static file assets could be served from a content management system. Store WebApp 608 contains various asset types such as Java Server Pages (JSP) 610 and HTML pages 612. The asterisks indicate that Store WebApp 608 contains multiple files of JSP 610 and HTML 612.

All requests submitted to e-Commerce production system 600 go through a servlet that dispatches to an adapter which manages the session for a client. In an exemplary embodiment, an instance of this servlet exists for each Web application. Having an adapter per gateway servlet provides the capability to have different adapters registered for each Web application, which essentially provides the ability to have a single client to e-Commerce production system 600 operate under different sessions, depending on the Web application the client is accessing.

In another exemplary embodiment, in order to satisfy the need for a content provider to be able to simultaneously perform updates while acting as a customer, a preview adapter will be registered to Preview WebApp 604 to allow the content provider to test various scenarios as another user. This preview adapter will also optionally disallow the content provider, acting as another user, to execute operations that would 'affect' a live site, such as actual orders being placed.

One of the major requirements of previewing in a production environment, such as e-Commerce production system 600, is the ability to preview based on a date to verify promotions targeted for a particular date. In an exemplary embodiment a preview context is introduced to enable this capability. The preview context allows a content provider to validate content without influencing other users and ensuring the content does not require additional changes after validation. In order to achieve this, a context object will be associated with the preview operation that will represent the state information to be used when deciding the content to preview along with other external events. By associating a preview context with an activity, operations can use this content state information as a basis to decide what content to display. To solve the date issue, the preview context will contain the preview date which will be used to render the content to be displayed. Each session having a unique preview context allows multiple users to preview independent content without having to change content data or global system state information. The advantage of introducing this context is that all operations may use this context as a basis for deciding the data to display, instead of having to change the global system state just to validate content.

An electronic commerce Web application, such as Store WebApp 608, works seamlessly with the contexts, regardless of how the contexts are established, either by the production mode or the preview web application. In order for electronic commerce Web applications to support both the production mode and the preview mode, the electronic commerce Web applications need to be designed to work with contexts, either one context or multiple contexts.

Figure 7:
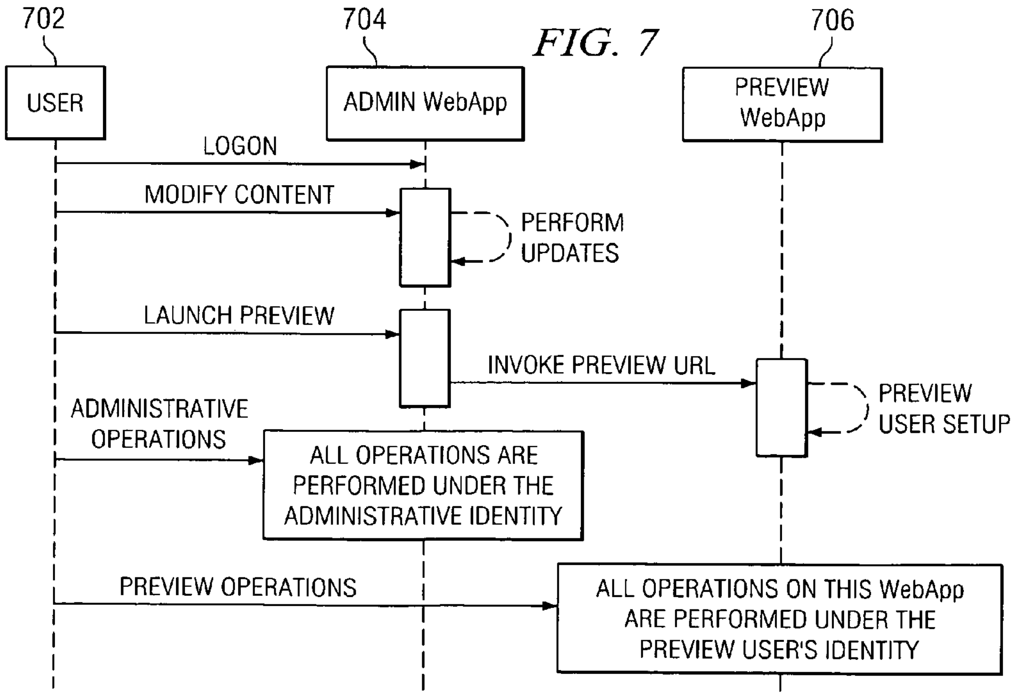
FIG. 7 is a sequence diagram of information flow for an administrator who is performing a preview in accordance with an exemplary embodiment of the present invention.

FIG. 7 is a sequence diagram depicting the information flow for a content provider who is performing a preview in accordance with an exemplary embodiment of the present invention. When an administrator, user 702, logs onto Admin WebApp 704 to perform content manipulation operations, credentials are generated and sent back to the client in the form of cookies. If user 702 desires to preview, user 702 supplies the information of the store they would like to preview and clicks on the preview button in Admin WebApp 704. Upon clicking the preview button, user 702 causes a new browser window to open (a browser thread), which will invoke a URL on Preview WebApp 706. Preview WebApp 706 performs pre-processing activities such as marking that the request should not retrieve data from the site's cache. Next, the preview adapter would be instantiated and invoked. The preview adapter, upon detecting the Preview Web application context root, would look for the credentials used by the client to access Admin WebApp 704. The preview adapter would copy over information from these credentials into a new set of credentials that are only recognizable by the preview adapter, and then proceed to issue these new credentials as cookies with names that differ from those used by the adapter registered for Admin WebApp 704. Information copied from the credentials associated with Admin WebApp 704, to the credentials associated with Preview WebApp 706 would be included in the preview context. Finally, Preview WebApp 706 will dispatch a request onto the store Web application for normal business logic processing.

In some instances, it may be desirable to limit the operations that a preview application can mimic. For example, it might be desirable to prevent the completion of the checkout procedure when previewing a shopping page so as to prevent a false order from entering into the system. Configuration is used to define the name of the command or view whose execution is not permitted during a preview session. The configuration containing the exclusions may be located anywhere and may be implemented in any applicable format, including, but not limited to, an XML file, a database table, a spreadsheet, a flat file, contained in the properties file, or hard coded.

In an exemplary embodiment of the present invention, this preview exclusion feature is implemented as a registry. If new entries are added to the registry file and the server is active then the administrator may proceed to the registry panel in the administrator console to refresh the registry without shutting down the server.

When a request is made to Preview WebApp 706, a check is made by the preview adapter to ensure that the name of the command or view that is being requested is not restricted by the preview Web application. The preview adapter performs this check by ensuring that the URL action does not exist in the exclusion configuration.

Figure 8:
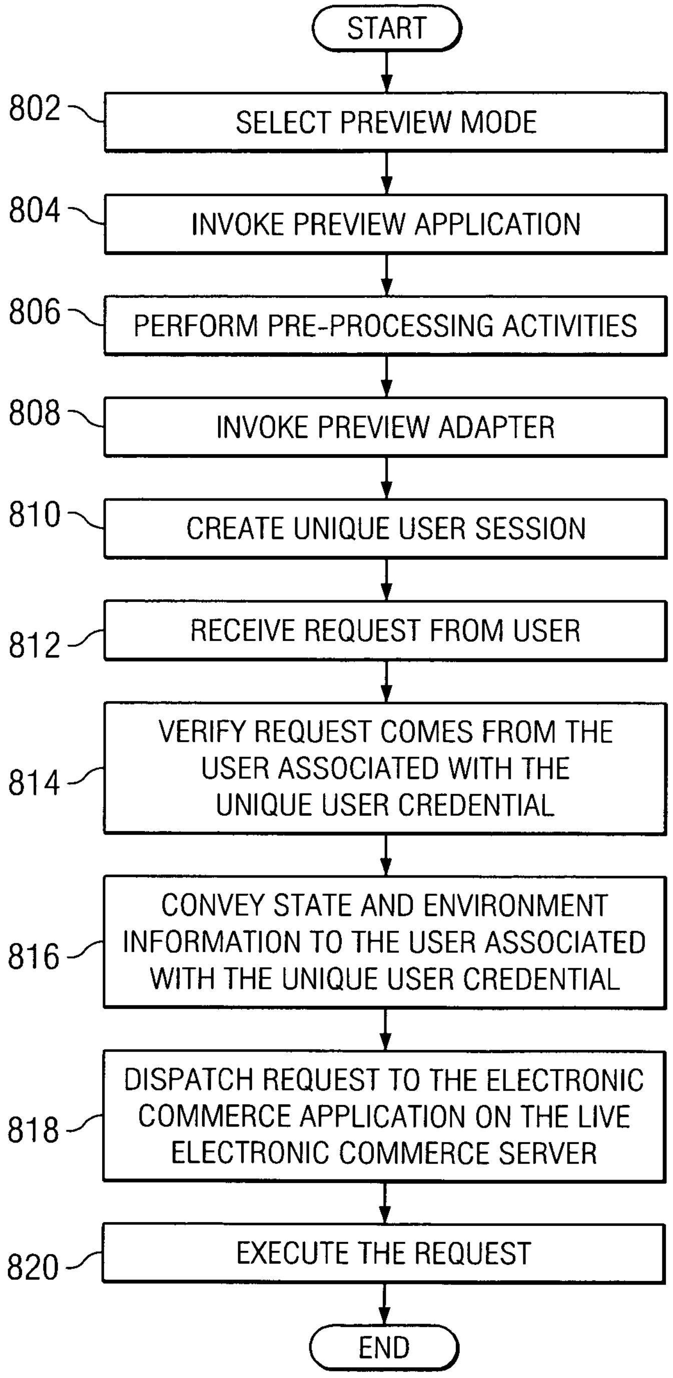
FIG. 8 is a flowchart illustrating an operation of previewing electronic commerce content in a live electronic commerce environment in accordance with an exemplary embodiment of the present invention.

FIG. 8 is a flowchart illustrating an operation of previewing electronic commerce content in a live electronic commerce environment in accordance with an exemplary embodiment of the present invention. The operation begins when a user selects the preview mode (step 802). A preview application is invoked (step 804). The preview application performs pre-processing activities (step 806). The preview application invokes a preview adapter (step 808). The preview adapter creates a unique user session associated with the user for use in the preview mode (step 810). The unique user session differs from a user's original session. Next, the operation receives a request from the user (step 812). The preview adapter verifying that the request originates from the user associated with the unique user session (step 814). The preview adapter conveys state and environment related to the request to an electronic commerce application on the live electronic commerce server (step 816). The preview web application dispatches the request to an electronic commerce application on the live electronic commerce server (step 818). Then the request is executed (step 820) and the operation ends.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:

invoking a first web application responsive to activation of a preview mode;

establishing a preview session with the first web application on a production environment server responsive to receiving a request to perform a command on the production environment server while in the preview mode;

instantiating a preview context and a content context for the preview session, wherein the preview context indicates a time in the future and wherein the content context indicates how data yielded from performance of the command can be viewed;

the first web application dispatching the request to a second web application on the production environment server; and the second web application processing the request with business logic in accordance with, on the preview context and the content context.

2. The method of claim 1, wherein the first web application and the second web application are associated with different ports.

3. The method of claim 1, wherein the first web application comprises a preview web application for previewing content of the production environment server for a future merchant promotion and the second web application comprises a production environment web application for use by customers of a live production electronic commerce website that comprises the production environment server.

4. The method of claim 1 further comprising conveying the preview context and the content context for the preview session to the second web application.

5. The method of claim 4 further comprising:

instantiating an adapter for the first web application; and a servlet on the production environment server dispatching the request to the adapter.

6. The method of claim 5, wherein said conveying the preview context and the content context for the preview session to the second web application comprises the first web application passing the adapter to the second web application.

7. The method of claim 6, wherein the second web application uses the adapter passed from the first web application for processing the request instead of a second adapter instantiated for the second web application, wherein the second adapter manages a non-preview user session.

8. The method of claim 1 further comprising the first web application performing at least one pre-processing activity before dispatching the request to the second web application on the production environment server.

9. The method of claim 8, wherein the pre-processing activity comprises at least one of instantiating the preview context with data for testing purchasing scenarios on the production environment server while in the preview mode, determining whether the command of the request is allowed in the preview mode, ensuring that the data yielded from performance of the command is live production data and not from cache of the production environment server, and preventing mixing of data of the preview session and data of a non-preview session.

10. The method of claim 9, wherein said determining whether the command of the request is allowed in the preview mode comprises evaluating the command of the request against a set of one or more commands not allowed during the preview mode.

11. The method of claim 9, wherein said preventing mixing of data of the preview session and data of the non-preview session comprises at least one of preventing adjusting of inventory level on the production environment server based on the data of the preview session and preventing logging site traffic based on the preview session.

12. The method of claim 1 further comprising:

wherein said establishing the preview session with the first web application on the production environment server comprises establishing a preview identity for the preview session, wherein the preview identity is distinct from an identity used for a non-preview user session and the preview identity is associated with the preview mode;

instantiating an adapter for the first web application, wherein said establishing the preview identity for the preview session comprises copying information from credentials of a client that submitted the request into new credentials recognizable by the adapter;

issuing the new credentials as a cookie with a name that differs from a name of a cookie of a second adapter of a third web application, wherein the client is associated with the third web application.

13. The method of claim 12, wherein the third web application comprises an administrative web application for manipulating content on the production environment server.

14. The method of claim 1, wherein the time in the future corresponds to a planned online merchant promotion being previewed with the request.

15. The method of claim 1, wherein the preview context comprises data and functionality that the business logic can use for handling the command.

16. The method of claim 1, wherein the content context indicates limitations for general viewing of data yielded from performance of the command.

17. An electronic commerce live production system comprising:

a processor; and a computer readable medium encoded with an electronic commerce store front web application, an administrative web application, and a preview web application, the administrative web application configured to launch the preview web application responsive to indication of a preview mode;

the preview web application configured to, establish a preview session on the electronic commerce live production system responsive to receiving a request to perform a command on the live production system, instantiate a preview context and a content context for the preview session, wherein the preview context indicates a time in the future and wherein the content context indicates how data yielded from performance of the command can be viewed, dispatch the request to the electronic commerce store front web application, the electronic commerce store front web application configured to process the request with business logic in accordance with the preview context and the content context.

18. The electronic commerce live production system of claim 17, wherein the preview web application is associated with a first port and the electronic commerce store front web application is associated with a second port.

19. A computer program product for previewing content of a live production electronic commerce website, the computer program product comprising:

a computer readable storage medium having computer usable program code embodied therewith, the computer usable program code configured to:

establish a preview session with the first web application on a production environment server responsive to activation of a preview mode and responsive to receiving a request to perform a command on the live production environment server while in the preview mode;

instantiate a preview context and a content context for the preview session, wherein the preview context indicates a time in the future and wherein the content context indicates how data yielded from performance of the command can be viewed;

dispatch the request from the first web application to a second web application on the production environment server for the second web application to process the request with business logic thereof in accordance with the preview context and the content context.

20. The computer program product of claim 19, wherein the computer usable program code is further configured to perform at least one pre-processing activity before dispatching the request to the second web application on the production environment server, wherein the pre-processing activity comprises one of instantiating the preview context with data for testing various scenarios on the production environment server, determining whether the command of the request is allowed in the preview mode, ensuring that yielded from performance of the command is live production data and not from cache of the production environment server, and preventing mixing of data of the preview session and data of a non-preview session.

* * * * *